(12) United States Patent
Russell et al.

(10) Patent No.: US 9,862,404 B2
(45) Date of Patent: Jan. 9, 2018

(54) STEERING COLUMN ASSEMBLY

(71) Applicant: Steering Solutions IP Holding Corporation, Saginaw, MI (US)

(72) Inventors: James C. Russell, Fairgrove, MI (US); Michael P. Anspaugh, Bay City, MI (US); Melvin L. Tinnin, Clio, MI (US); Donald A. Buzzard, Saginaw, MI (US); Malgorzata R. Szeliga, Essexville, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 22 days.

(21) Appl. No.: 14/849,263

(22) Filed: Sep. 9, 2015

(65) Prior Publication Data
US 2017/0066467 A1    Mar. 9, 2017

(51) Int. Cl.
*B62D 1/184* (2006.01)
*B62D 1/19* (2006.01)

(52) U.S. Cl.
CPC ............ *B62D 1/184* (2013.01); *B62D 1/197* (2013.01)

(58) Field of Classification Search
CPC .......... B62D 1/184; B62D 1/187; B62D 1/19
See application file for complete search history.

(56) References Cited

U.S. PATENT DOCUMENTS

| | | | | |
|---|---|---|---|---|
| 2,744,419 A * | 5/1956 | Chayne | ................... | B62D 1/184 200/61.54 |
| 3,069,875 A * | 12/1962 | Crum, Jr. | ................. | F16D 1/101 464/169 |
| 3,851,543 A * | 12/1974 | Krom | ..................... | B62D 1/184 188/67 |
| 3,961,866 A * | 6/1976 | Nichols | ..................... | F03G 7/04 165/45 |
| 3,991,633 A * | 11/1976 | Molnar | ................... | B62D 1/184 251/279 |
| 4,265,139 A * | 5/1981 | Logemann | ............. | B62D 1/184 74/485 |
| 5,029,489 A * | 7/1991 | Burmeister | ............ | B62D 1/184 280/775 |
| 5,426,994 A * | 6/1995 | Khalifa | .................. | B62D 1/184 280/775 |
| 5,537,890 A * | 7/1996 | Thomas | ................. | B62D 1/184 280/775 |
| 5,577,859 A * | 11/1996 | Nau | ........................ | F16D 1/116 403/315 |
| 5,743,151 A * | 4/1998 | Khalifa | .................. | B62D 1/184 280/775 |
| 5,979,938 A * | 11/1999 | Menjak | .................. | B62D 1/184 280/775 |
| 6,058,791 A * | 5/2000 | Brunet | ...................... | F02C 7/32 192/69.9 |
| 6,364,357 B1 * | 4/2002 | Jurik | ..................... | B62D 1/184 280/775 |

(Continued)

Primary Examiner — James A English
(74) Attorney, Agent, or Firm — Cantor Colburn LLP

(57) ABSTRACT

A steering column assembly includes a plunger assembly received within an opening defined by a mounting bracket. The plunger assembly includes a sleeve, a plunger, and a biasing member. The sleeve disposed within the opening. The plunger slidably disposed within the sleeve. The biasing member that engages the plunger to bias the plunger towards a deployed position.

20 Claims, 4 Drawing Sheets

(56) References Cited

U.S. PATENT DOCUMENTS

| | | | |
|---|---|---|---|
| 6,591,709 B1* | 7/2003 | Kim | B62D 1/184 280/775 |
| 2002/0153234 A1* | 10/2002 | Durocher | B60Q 1/1461 200/61.54 |
| 2004/0159173 A1* | 8/2004 | Sawada | B62D 1/184 74/492 |
| 2008/0217900 A1* | 9/2008 | Ozsoylu | B62D 1/184 280/775 |
| 2014/0140759 A1* | 5/2014 | Bodtker | F16D 1/0894 403/322.2 |
| 2015/0375771 A1* | 12/2015 | Tinnin | G05G 5/04 74/493 |

* cited by examiner

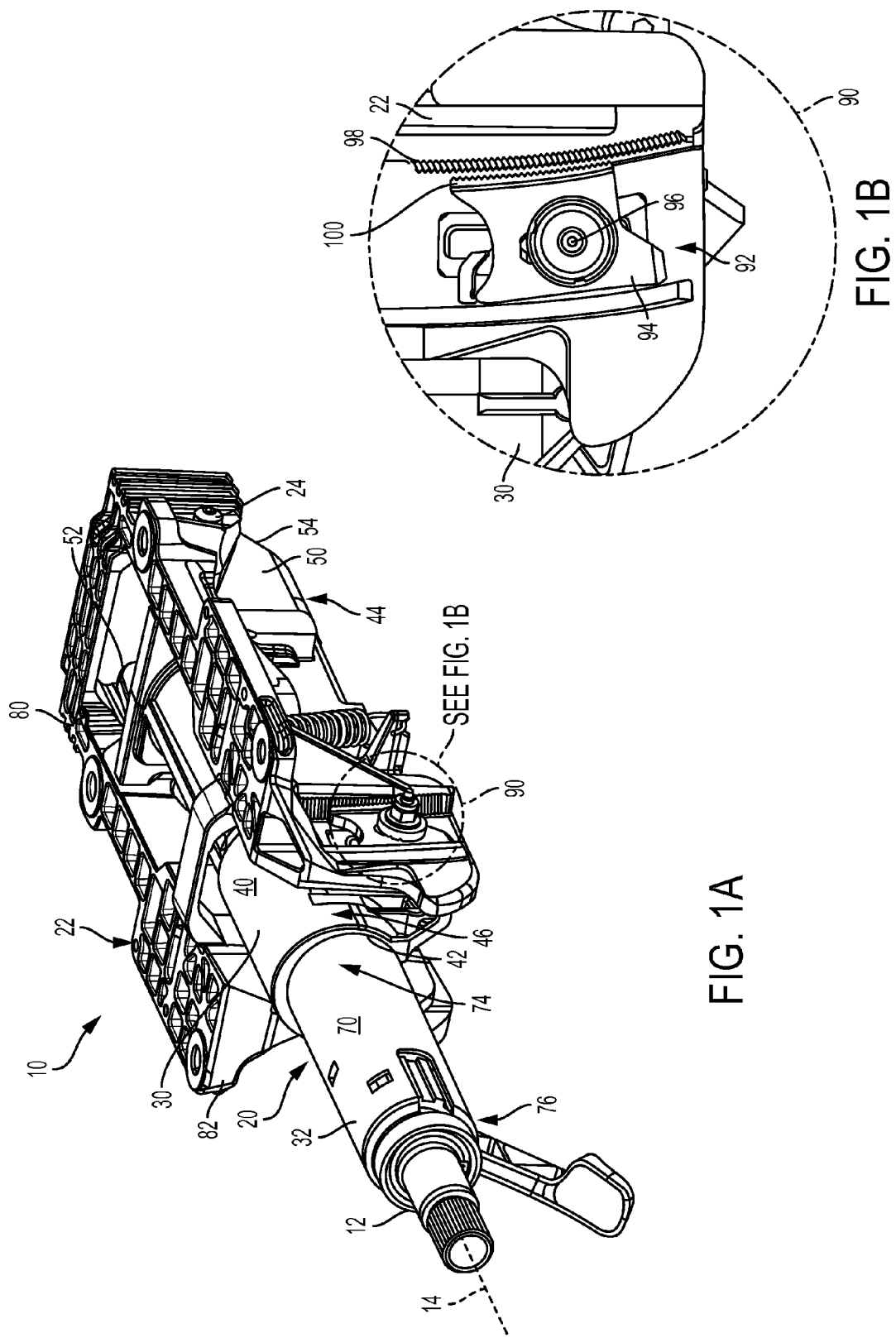

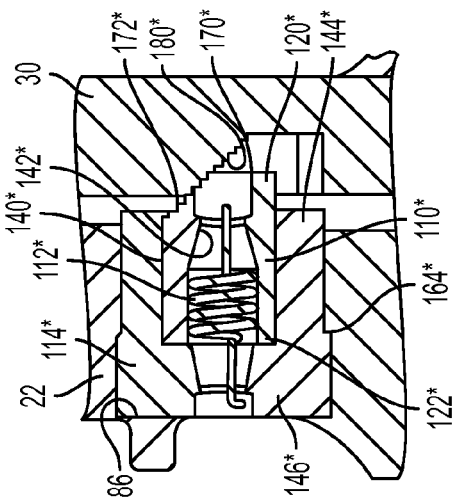
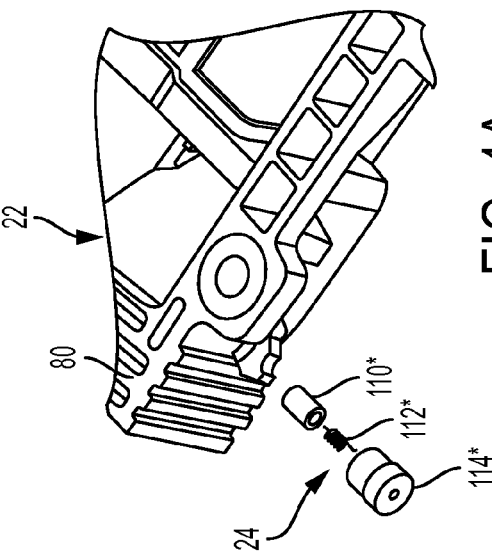
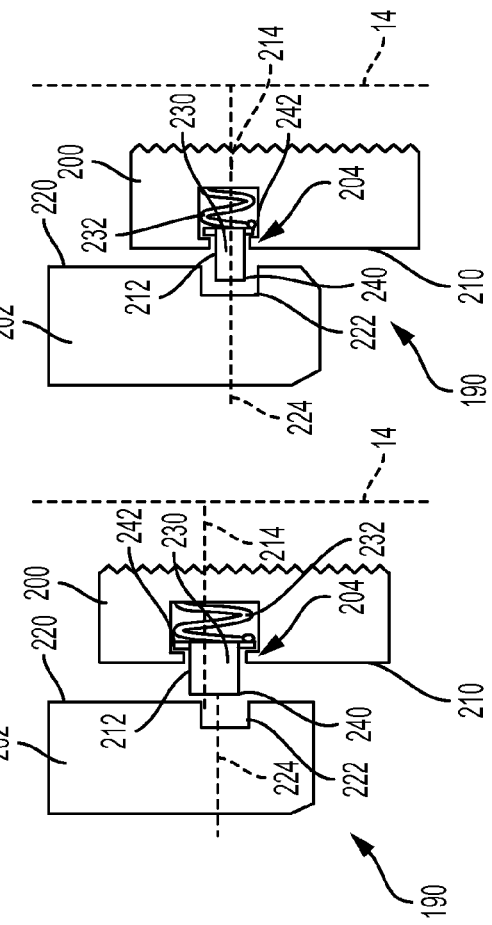

STEERING COLUMN ASSEMBLY

BACKGROUND OF THE INVENTION

The present disclosure relates to a collapsible steering column assembly.

A vehicle steering column assembly may collapse in a controlled manner in the event of a vehicle crash. During a vehicle crash the steering column assembly may collapse to inhibit intrusion of a steering shaft further into the vehicle passenger compartment and may collapse away from an operator of the vehicle. However, during some vehicle collapse events the steering column assembly may rotate up or down

SUMMARY OF THE INVENTION

In an embodiment of the present disclosure, a steering column assembly includes a jacket assembly, a mounting bracket, and a plunger assembly. The jacket assembly extending along a first axis and is pivotable about a pivot axis disposed substantially perpendicular to the first axis. The jacket assembly having a slot spaced apart from the pivot axis. The mounting bracket disposed on the jacket assembly and configured to rotate the jacket assembly about the pivot axis. The mounting bracket defining an opening and defining a recess spaced apart from the opening. The plunger assembly at least partially received within the opening, the plunger assembly includes a plunger and a biasing member. The plunger slidably disposed within the opening, having a first portion disposed proximate an exterior surface of the jacket assembly and a second portion disposed opposite the first portion. A biasing member disposed within the opening that engages the second portion and a preload fastener.

In an embodiment of the present disclosure, a steering column assembly includes a plunger assembly received within an opening defined by a mounting bracket. The plunger assembly including a sleeve, a plunger, and a biasing member. The sleeve having an exterior surface and an inner bore disposed within the opening. The plunger slidably disposed within the inner bore. The plunger having a first portion and a second portion disposed opposite the first portion, the first portion is disposed proximate a slot defined by a jacket assembly connected to the mounting bracket. The biasing member disposed within the inner bore that engages the second portion and biases the plunger towards a deployed position.

In an embodiment of the present disclosure, a steering column assembly includes a jacket assembly, a mounting bracket, and a plunger assembly. The jacket assembly extending along a first axis, the jacket assembly having an exterior surface and defining an opening that extends along a second axis. The mounting bracket having an interior surface disposed proximate the exterior surface. The mounting bracket defining a slot that extends along a third axis, the slot proximately aligned with the opening. The plunger assembly received within the opening, the plunger assembly includes a plunger and a biasing member. The plunger slidably disposed within the opening. The plunger having a first portion disposed proximate the exterior surface and a second portion disposed opposite the first portion. The biasing member disposed within the opening that engages the second portion.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 1A and 1B are perspective views of a steering column assembly having a rake adjustment assembly;

FIGS. 4A and 4B are partial perspective views of a plunger assembly of a steering column assembly; and FIGS. 5A and 5B are partial perspective views of a plunger assembly of a steering column assembly.

DETAILED DESCRIPTION

Figure 2A:
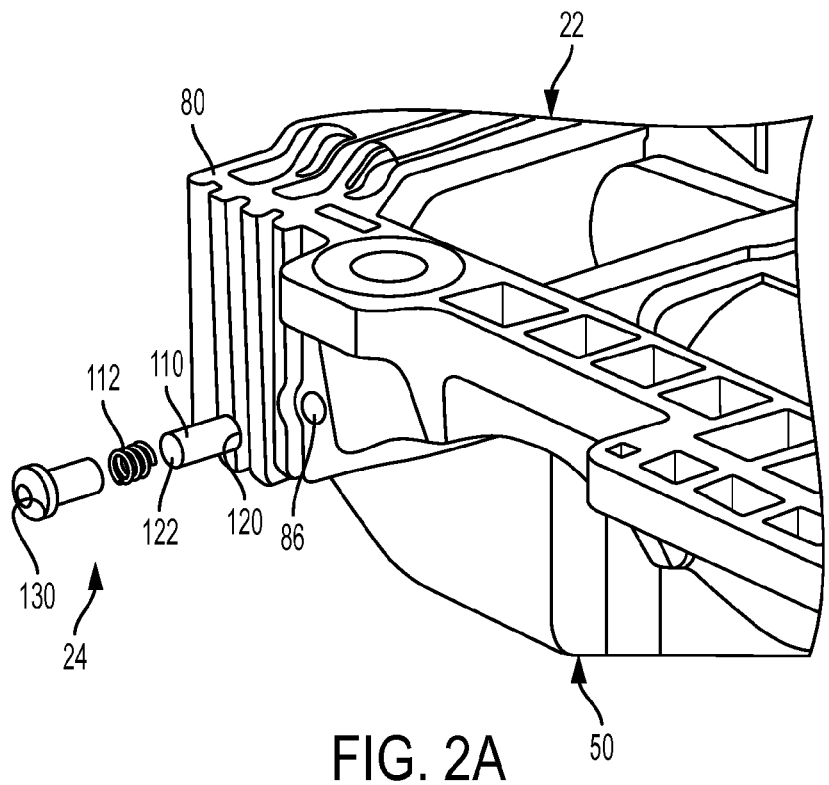
FIGS. 2A and 2B, are partial perspective views of a plunger assembly of a steering column assembly.

Referring now to the Figures, where the invention will be described with reference to specific embodiments, without limiting same, it is to be understood that the disclosed embodiments are merely exemplary of the present disclosure that is embodied in various and alternative forms. The figures are not necessarily to scale; some features is exaggerated or minimized to show details of particular components. Therefore, specific structural and functional details disclosed herein are not to be interpreted as limiting, but merely as a representative basis for teaching one skilled in the art to variously employ the present disclosure.

Referring to FIGS. 1A-2B, an exemplary steering column assembly 10 is shown. The steering column assembly 10 is provided with a vehicle, such as a motor vehicle like a truck, bus, farm equipment, military transport or weaponry vehicle, or cargo loading equipment for land, air, or marine vessels. The steering column assembly 10 is operatively connected to a steering wheel that may articulate at least one vehicle wheel in response to rotation of the steering wheel.

The steering column assembly 10 and a steering shaft 12 extend longitudinally along a first axis 14. The steering column assembly 10 includes a jacket assembly 20, a mounting bracket 22, and a plunger assembly 24.

The jacket assembly 20 includes a first jacket assembly 30 and a second jacket assembly 32. The first jacket assembly 30 extends longitudinally along the first axis 14. The first jacket assembly 30 defines an outer surface 40 and defines an inner bore 42. The steering shaft 12 extends through the first jacket assembly 30 and is spaced apart from the inner bore 42.

The first jacket assembly 30 includes a first portion 44 and a second portion 46. The first portion 44 of the first jacket assembly 30 operatively connects the jacket assembly 20 to a vehicle structure via the mounting bracket 22. The first portion 44 of the first jacket assembly 30 is configured as a fork that includes a first fork portion 50 and a second fork portion 52. The first fork portion 50 and the second fork portion 52 are disposed proximate a first end 54 of the first portion 44 of the first jacket assembly 30. The first fork portion 50 is spaced apart from the second fork portion 52. The first fork portion 50 is disposed substantially parallel to the first axis 14 but not coplanar with the first axis 14. The first fork portion 50 is disposed substantially parallel to but may not be coplanar with the second fork portion 52. The second fork portion 52 is disposed substantially parallel to the first axis 14 but may not be coplanar with the first axis 14.

The first fork portion 50 includes a protrusion 56. The protrusion 56 extends away from an exterior surface of the first fork portion 50. The protrusion 56 defines a pivot axis 60. The pivot axis 60 is disposed substantially perpendicular to the first axis 14. In at least one embodiment, the second fork portion 52 also includes a protrusion 56 configured as a pivot. As such, the pivot axis 60 extends through the first fork portion 50 and the second fork portion 52.

The first portion 44 of the first jacket assembly 30 includes a slot 62 configured as a blind hole that extends partially through the first jacket assembly 30. The slot 62 is completely defined by or bound within the first portion 44 of the first jacket assembly 30 and is disposed between and is spaced apart from the pivot axis 60 and the second portion 46 of the first jacket assembly 30. The slot 62 includes a generally arcuate shape having an arced portion arcing towards the second portion 46 of the first jacket assembly 30. The slot 62 extends about a second axis 64. The second axis 64 is disposed substantially perpendicular to the first axis 14.

The second portion 46 of the first jacket assembly 30 is spaced apart from and disposed opposite the first portion 44. The second portion 46 is disposed opposite the first end 54. The second portion 46 is disposed proximate the second jacket assembly 32.

The second jacket assembly 32 extends longitudinally along the first axis 14. The second jacket assembly 32 includes a generally tubular shape and may define an outer surface 70 and an inner bore. The steering shaft 12 extends through the second jacket assembly 32 and is spaced apart from the inner bore.

The second jacket assembly 32 includes a first portion 74 at least partially received within the inner bore 42 of the first jacket assembly 30. The outer surface 70 of the second jacket assembly 32 is slidably engaged with the inner bore 42 of the first jacket assembly 30. The second jacket assembly 32 is configured to translate relative to the first jacket assembly 30.

The second jacket assembly 32 includes a second portion 76 spaced apart from and disposed opposite the first portion 74. The second portion 76 is configured to operatively engage the steering wheel.

The rake mounting bracket 22 is disposed on the jacket assembly 20. The rake mounting bracket 22 includes a first portion 80 and a second portion 82. The first portion 80 of the rake mounting bracket 22 is configured to engage at least a portion of the first portion 44 of the first jacket assembly 30. The first portion 80 of the rake mounting bracket 22 may define a pocket or a recess 84 configured to receive the protrusion 56. Referring to FIG. 2B, the first portion 80 of the rake mounting bracket 22 may define an opening 86. The opening 86 is spaced apart from the recess 84. The opening 86 extends completely through the first portion 80 of the rake mounting bracket 22 along a third axis 88. The third axis 88 is disposed substantially perpendicular to the first axis 14. The second axis 64 is disposed substantially parallel to but not coaxial with the third axis 88. A second opening is disposed opposite the opening 86 on the opposite side of the first portion 80 of the mounting bracket 22.

The second portion 82 of the rake mounting bracket 22 is configured to engage at least a portion of the second portion 46 of the first jacket assembly 30. With specific reference to FIGS. 1A and 1B, the second portion 82 of the rake mounting bracket 22 defines a mounting region 90 configured to receive a rake adjustment assembly 92 to operatively couple the rake mounting bracket 22 to the first jacket assembly 30.

The rake adjustment assembly 92 is configured to rotate the jacket assembly 20 about the pivot axis 60 relative to the mounting bracket 22. The pivoting and/or rotation of the jacket assembly 20 may cause the steering column assembly 10 to undergo a raking movement or pitching movement to adjust the position of the steering column assembly 10. The rake adjustment assembly 92 includes a rake element 94, a rake bolt 96, and mounting bracket teeth 98.

The rake element 94 is received within the mounting region 90 of the mounting bracket 22. The rake element 94 engages the second portion 46 of the first jacket assembly 30 to couple the rake mounting bracket 22 to the jacket assembly 20. The rake element 94 is secured to the first jacket assembly 30 by the rake bolt 96. The rake element 94 includes a plurality of rake adjustable teeth 100. The rake adjustable teeth 100 may face away from the steering wheel and towards the first portion 44 of the first jacket assembly 30 and the first portion 80 of the mounting bracket 22. The rake adjustable teeth 100 are configured to engage the mounting bracket teeth 98. The mounting bracket teeth 98 are formed on the mounting bracket 22. The mounting bracket teeth 98 face towards the second portion 46 of the first jacket assembly 30 and the second portion 82 of the mounting bracket 22.

The clearance between the mounting bracket teeth 98 with the rake adjustable teeth 100 typically allows the rake or pitch adjustment of the steering column assembly 10. During a collapse event, the mounting bracket teeth 98 may become forcibly engaged with the rake adjustable teeth 100 due to movement of the first jacket assembly 30 away from the passenger compartment creating relative motion between the second jacket assembly 32 and the stationary rake mounting bracket 22. The forcible engagement between the mounting bracket teeth 98 and the rake mounting bracket 22 inhibit further rotation of the steering column assembly 10 about the pivot axis 60. The plunger assembly 24 may aid the rake adjustment assembly 92 in inhibiting further rotation of the steering column assembly 10 about the pivot axis 60 during and/or after a collapse event.

The plunger assembly 24 is at least partially received within the opening 86 of the rake mounting bracket 22 while the plunger assembly 24 is in a retracted position. The plunger assembly 24 extends through the opening 86 of the rake mounting bracket 22 and is at least partially received within the slot 62 of the jacket assembly 20 while the plunger assembly is in or moving towards a deployed position. The plunger assembly 24 moves between the retracted position and the deployed position in response to a crash event or collapse event in which the second jacket assembly 32 translates relative to the first jacket assembly 30 causing relative movement between the first jacket assembly 30 and the rake mounting bracket 22. For example, during a collapse event the second jacket assembly 32 and first jacket assembly 30 translates away from the passenger compartment such that a component of the plunger assembly 24 is received within the slot 62. The plunger assembly 24 includes a plunger 110, a biasing member 112, and in one or more embodiments a sleeve 114.

Figure 2B:
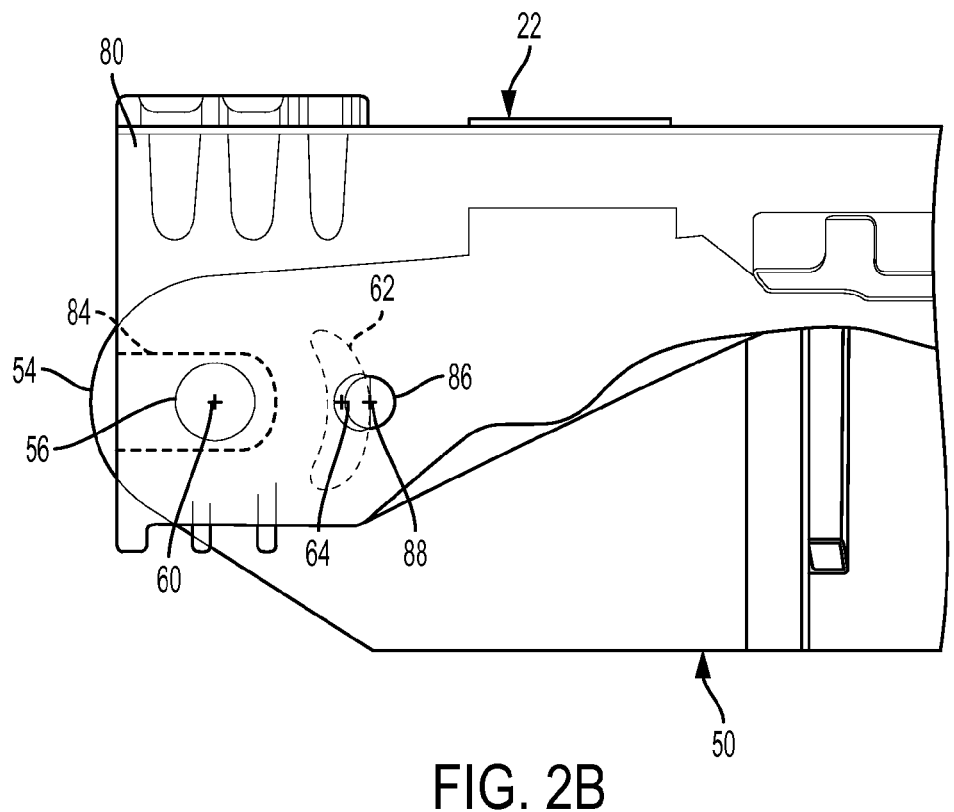

Referring to FIG. 2A, a first exemplary embodiment of the plunger assembly 24 is shown. The plunger 110 is slidably disposed within the opening 86 of the mounting bracket 22. The plunger 110 is an elongate body, shaped to match the shape of the opening 86. The plunger 110 includes a first portion 120 disposed opposite a second portion 122. The first portion 120 of the plunger 110 is disposed proximate the first jacket assembly 30. More specifically, the first portion 120 of the plunger 110 is disposed proximate the exterior surface of the first fork portion 50 of the first jacket assembly 30. In at least one embodiment, the first portion 120 of the plunger 110 is disposed proximate the exterior surface of the second fork portion 52 of the first jacket assembly 30. The biasing member 112 may also be disposed within the opening 86 of the mounting bracket 22. The biasing member 112 engages the second portion 122 of the plunger 110. The opening 86 is provided with internal threads such that a preload fastener 130 may threadingly engage to adjust a preload force of the biasing member 112 and to couple the plunger assembly 24 to the mounting bracket 22. The preload force applied to the biasing member 112 is configured to bias the plunger 110 towards the deployed position. The biasing member 112 is a linear spring, a torsional spring, an actuator, or the like configured to provide a preload force or biasing force to the plunger 110.

Prior to a collapse event, the jacket assembly 20 is in a first position. There may not be relative motion between the first jacket assembly 30 and the second jacket assembly 32 while the jacket assembly 20 is in the first position. Additionally, while the jacket assembly 20 is in the first position, the first portion 120 of the plunger 110 engages an exterior surface of the jacket assembly 20. The first portion 120 of the plunger 110 engages the exterior surface of the first fork portion 50 of the first jacket assembly 30. The first portion 120 of the plunger 110 engages the exterior surface of the first fork portion 50 proximate the slot 62. Referring to FIG. 2B, the slot 62 may at least partially overlap the opening 86 of the rake mounting bracket 22 while the jacket assembly 20 is in the first position. The partial overlapping between the slot 62 and the opening 86 inhibits the plunger 110 from being received within the slot 62.

During a collapse event, the jacket assembly 20 translates from the first position towards a second position. There is relative motion between the second jacket assembly 32 and the first jacket assembly 30 during the collapse event causing the first jacket assembly to move relative to the rake mounting bracket 22. The first jacket assembly 30 may move relative to the mounting bracket 22 such that the slot 62 and the opening 86 may become proximately aligned. The slot 62 and the opening 86 is proximately aligned such that the second axis 64 is disposed substantially parallel and coaxial with the third axis 88. The proximate alignment may result in the first portion 120 of the plunger 110 being received within the slot 62 to inhibit relative motion between the first jacket assembly 30 and the rake mounting bracket 22. Furthermore, the first portion 120 of the plunger 110 received within the slot 62 inhibits further rotation, raking, or pitching of the jacket assembly 20 about the pivot axis 60.

Figure 3A:
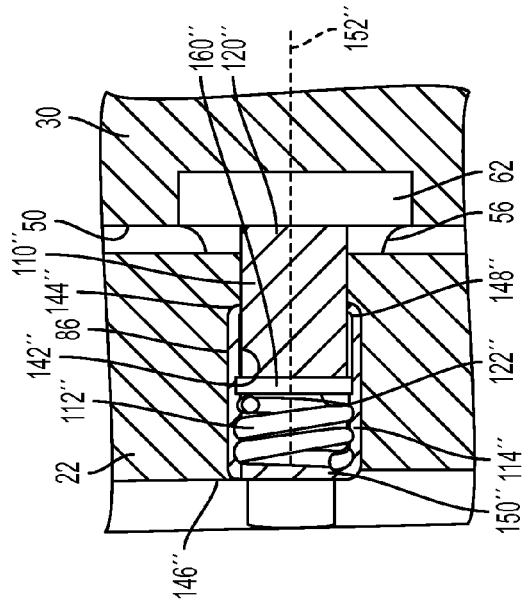
FIGS. 3A, 3B, 3C, and 3D, are partial perspective views of a plunger assembly of a steering column assembly.

Referring to FIGS. 3A through 3D, various embodiments of the plunger assembly 24 are shown. Referring to FIG. 3A, a sleeve 114' is disposed within the opening 86 of the rake mounting bracket 22. The sleeve 114' includes an exterior surface 140', an inner bore 142', a first end portion 144', and a second end portion 146'. The exterior surface 140' engages an interior surface of the opening 86. The sleeve 114' is press fit into the opening 86. The inner bore 142' is provided with internal threads that may threadingly receive a preload fastener 130. The first end portion 144' is disposed proximate the first portion 44 of the first jacket assembly 30. The first end portion 144' is spaced apart from and does not engage the exterior surface of the first fork portion 50.

The plunger 110' is slidably disposed within the inner bore 142 of the sleeve 114. The plunger 110' is an elongate body having the first portion 120' disposed opposite the second portion 122'. The first portion 120' is disposed proximate the first jacket assembly 30. The first portion 120' of the plunger 110' is disposed proximate the exterior surface of the first fork portion 50 of the first jacket assembly 30. The second portion 122' of the plunger 110' includes a lip 160'. The lip 160' extends about the second portion 122' of the plunger 110'.

The biasing member 112' is disposed within the inner bore 142' of the sleeve 114'. The biasing member 112' engages the second portion 122' of the plunger 110' and the preload fastener 130. The engagement of the biasing member 112' with the second portion 122' of the plunger 110' and the preload fastener 130 applies a preload force to the biasing member 112' to bias the plunger 110' towards the deployed position.

Prior to a collapse event, the jacket assembly 20 is in a first position. There may not be relative motion between the first jacket assembly 30 and the second jacket assembly 32 while the jacket assembly 20 is in the first position. Additionally, while the jacket assembly 20 is in the first position the first portion 120' of the plunger 110' is disposed proximate the slot 62.

During a collapse event, the jacket assembly 20 translates from the first position towards a second position. There is relative motion between the second jacket assembly 32 and the first jacket assembly 30 during the collapse event causing relative motion between the first jacket assembly 30 and the rake mounting bracket 22. The relative motion between the first jacket assembly 30 and the rake mounting bracket 22 may cause the plunger 110' to move from a retracted position towards a deployed position. The first portion 120' of the plunger 110' is received within the slot 62 to inhibit relative motion between the first jacket assembly 30 and the rake mounting bracket 22 and inhibits further rotation, raking, or pitching of the jacket assembly 20 about the pivot axis 60.

Figure 3B:
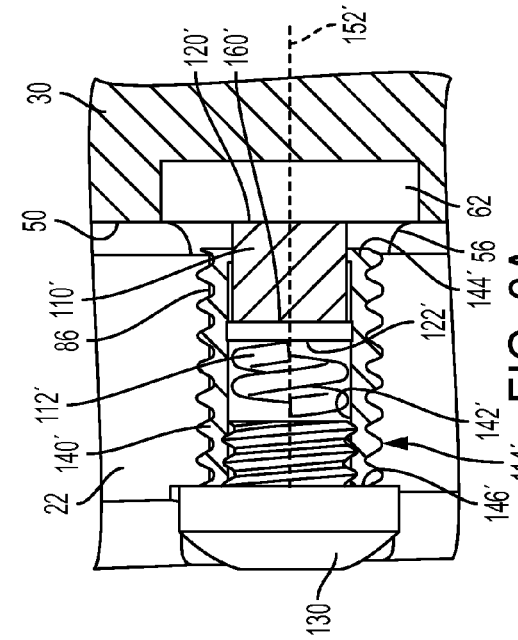

Referring to FIG. 3B, the sleeve 114" is disposed within the opening 86 of the mounting bracket 22. The sleeve 114" includes an exterior surface 140", an inner bore 142", a first end portion 144", and a second end portion 146". The exterior surface 140" engages an interior surface of the opening 86. The sleeve 114" is press fit into the opening 86. The first end portion 144" is disposed proximate the first portion 44 of the first jacket assembly 30. The first end portion 144" is spaced apart from and does not engage the exterior surface of the first fork portion 50.

The first end portion 144" includes a first rim 148" extending about the first end portion 144" towards a sleeve axis 152". The second end portion 146" is spaced apart from the first end portion 144". The second end portion 146" includes a second rim 150" extending about the second end portion 146" towards the sleeve axis 152".

The plunger 110" is slidably disposed within the inner bore 142" of the sleeve 114". The plunger 110" is an elongate body having the first portion 120" disposed opposite the second portion 122". The first portion 120" is disposed proximate the first jacket assembly 30. The first portion 120" of the plunger 110" is disposed proximate the exterior surface of the first fork portion 50 of the first jacket assembly 30. The second portion 122" of the plunger 110" includes a lip 160". The lip 160" extends about the second portion 122" of the plunger 110".

The biasing member 112" is disposed within the inner bore 142" of the sleeve 114". The biasing member 112" engages the second portion 122" of the plunger 110" and the first rim 148". The engagement of the biasing member 112" with the second portion 122" of the plunger 110" and the second rim 150" applies a preload force to the biasing member 112" to bias the plunger 110" towards the deployed position.

Prior to a collapse event, the jacket assembly 20 is in a first position. There may not be relative motion between the first jacket assembly 30 and the second jacket assembly 32 while the jacket assembly 20 is in the first position. Additionally, while the jacket assembly 20 is in the first position the first portion 120" of the plunger 110" is disposed proximate the slot 62.

During a collapse event, the jacket assembly 20 translates from the first position towards a second position. There is relative motion between the second jacket assembly 32 and the first jacket assembly 30 during the collapse event causing relative motion between the first jacket assembly 30 and the rake mounting bracket 22. The relative motion between the first jacket assembly 30 and the rake mounting bracket 22 may cause the plunger 110" to move from a retracted position towards a deployed position. The lip 160" of the plunger 110" engages the first rim 148" to inhibit further movement of the plunger 110" within the slot 62. The first portion 120" of the plunger 110" is received within the slot 62 to inhibit relative motion between the first jacket assembly 30 and the rake mounting bracket 22 and inhibits further rotation, raking, or pitching of the jacket assembly 20 about the pivot axis 60.

Figure 3C:
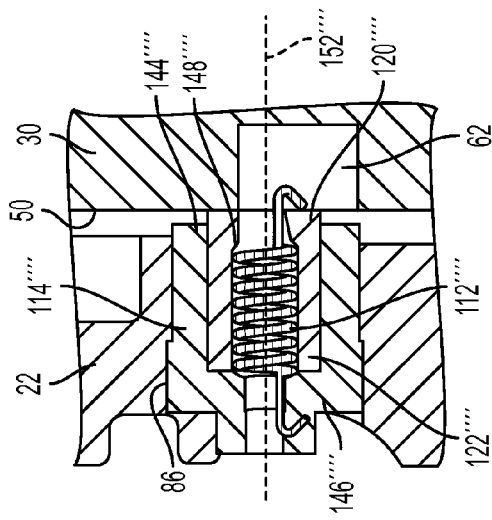

Referring to FIG. 3C, the sleeve 114''' is disposed within the opening 86 of the mounting bracket 22. The sleeve 114''' includes an exterior surface 140''', an inner bore 142''', a first end portion 144''', and a second end portion 146'''. The exterior surface 140''' engages an interior surface of the opening 86. The sleeve 114''' is press fit into the opening 86. The first end portion 144''' is disposed proximate the first portion 44 of the first jacket assembly 30. The first end portion 144''' is spaced apart from and not engage the exterior surface of the first fork portion 50.

The first end portion 144''' includes a first rim 148''' extending proximate the first end portion 144''' towards a sleeve axis 152'''. The second end portion 146''' is spaced apart from the first end portion 144'''.

The plunger 110''' is slidably disposed within the inner bore 142''' of the sleeve 114'''. The plunger 110''' is an elongate body having the first portion 120''' disposed opposite the second portion 122'''. The first portion 120''' is disposed proximate the first jacket assembly 30. The first portion 120''' of the plunger 110''' is disposed proximate the exterior surface of the first fork portion 50 of the first jacket assembly 30. The second portion 122''' of the plunger 110''' includes a lip 160'''. The lip 160''' extends about the second portion 122''' of the plunger 110'''.

The biasing member 112''' is disposed within the inner bore 142''' of the sleeve 114'''. The biasing member 112''' engages the second portion 122''' of the plunger 110''' and the first rim 148'''. The engagement of the biasing member 112''' with the second portion 122''' of the plunger 110''' and a cap 154''' may apply a preload force to the biasing member 112''' to bias the plunger 110"Δ towards the deployed position.

Prior to a collapse event, the jacket assembly 20 is in a first position. There may not be relative motion between the first jacket assembly 30 and the second jacket assembly 32 while the jacket assembly 20 is in the first position. Additionally, while the jacket assembly 20 is in the first position the first portion 120''' of the plunger 110''' is disposed proximate the slot 62.

During a collapse event, the jacket assembly 20 translates from the first position towards a second position. There is relative motion between the second jacket assembly 32 and the first jacket assembly 30 during the collapse event causing relative motion between the first jacket assembly 30 and the rake mounting bracket 22. The relative motion between the first jacket assembly 30 and the rake mounting bracket 22 may cause the plunger 110''' to move from a retracted position towards a deployed position. The lip 160''' of the plunger 110''' engages the first rim 148''' to inhibit further movement of the plunger 110''' within the slot 62, when the plunger 110''' is in the deployed position. The first portion 120''' of the plunger 110''' is received within the slot 62 to inhibit relative motion between the first jacket assembly 30 and the rake mounting bracket 22 and inhibits further rotation, raking, or pitching of the jacket assembly 20 about the pivot axis 60.

Figure 3D:
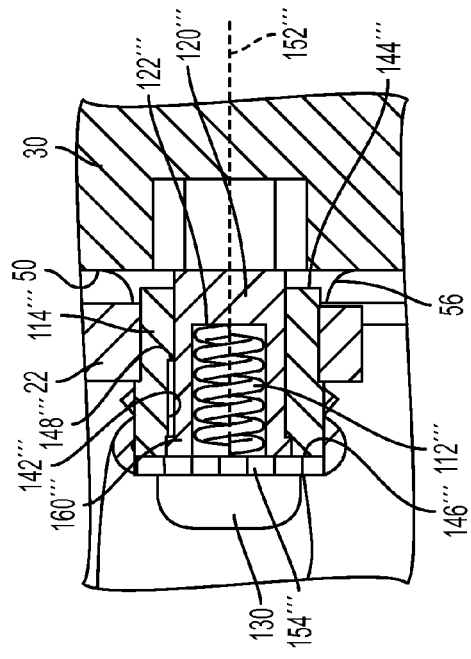

Referring to FIG. 3D, the sleeve 114'''' is disposed within the opening 86 of the mounting bracket 22. The sleeve 114'''' includes an exterior surface 140'''', an inner bore 142'''', a first end portion 144'''', and a second end portion 146''''. The exterior surface 140'''' engages an interior surface of the opening 86. The sleeve 114'''' is press fit into the opening 86. The first end portion 144'''' is disposed proximate the first portion 44 of the first jacket assembly 30. The first end portion 144'''' is spaced apart from and does not engage the exterior surface of the first fork portion 50.

The plunger 110'''' is slidably disposed within the inner bore 142'''' of the sleeve 114''''. The plunger 110'''' is an elongate body having the first portion 120'''' disposed opposite the second portion 122''''. The first portion 120'''' is disposed proximate the first jacket assembly 30. The first portion 120'''' of the plunger 110'''' is disposed proximate the exterior surface of the first fork portion 50 of the first jacket assembly 30. The first portion 120'''' of the plunger 110'''' includes a first rim 148''''. The first rim 148'''' extends about the first portion 120'''' of the plunger 110''''.

The biasing member 112'''' is disposed within the inner bore 142'''' of the sleeve 114''''. The biasing member 112'''' engages the second portion 122'''' of the plunger 110''' and a portion of the sleeve 114'''' proximate the second end portion 146''''. The engagement of the biasing member 112'''' with the second portion 122'''' of the plunger 110" and the portion of the sleeve 114'''' proximate the second end portion 146'''' applies a preload force to the biasing member 112'''' to bias the plunger 110'''' towards the deployed position.

Prior to a collapse event, the jacket assembly 20 is in a first position. There may not be relative motion between the first jacket assembly 30 and the second jacket assembly 32 while the jacket assembly 20 is in the first position. Additionally, while the jacket assembly 20 is in the first position the first portion 120''' of the plunger 110''' is disposed proximate the slot 62 and is not be received within the slot 62.

During a collapse event, the jacket assembly 20 translates from the first position towards a second position. There is relative motion between the second jacket assembly 32 and the first jacket assembly 32 during the collapse event causing relative motion between the first jacket assembly 30 and the rake mounting bracket 22. The relative motion between the first jacket assembly 30 and the rake mounting bracket 22 may cause the plunger 110'''' to move from a retracted position towards a deployed position. The first portion 120'''' of the plunger 110'''' is received within the slot 62 to inhibit relative motion between the first jacket assembly 30 and the rake mounting bracket 22 and inhibits further rotation, raking, or pitching of the jacket assembly 20 about the pivot axis 60.

Referring to FIGS. 4A and 4B, the sleeve 114* is disposed within the opening 86 of the rake mounting bracket 22. The sleeve 114* includes an exterior surface 140* and an inner bore 142*. The exterior surface 140* engages an interior surface of the opening 86. The sleeve 114* is press fit into the opening 86. The exterior surface 140* includes a stepped surface defining a shoulder 164*. The shoulder 164* engages the interior surface of the opening 86 of the rake mounting bracket 22 to set a predetermined depth of the plunger 114* with respect to the rake mounting bracket 22.

The plunger 110* is slidably disposed within the inner bore 142* of the sleeve 114*. The plunger 110* is an elongate body having the first portion 120* disposed opposite the second portion 122*. The first portion 120* of the plunger 110* is disposed proximate the first jacket assembly 30. The first portion 120* of the plunger 110* is disposed proximate the exterior surface of the first fork portion 50 of the first jacket assembly 30. The first portion 120* of the plunger 110* includes a first end surface 170* and a second end surface 172*. The first end surface 170* is disposed substantially parallel to but not coplanar with the first axis 14. The second end surface 172* is disposed at an angle with respect to the first end surface 170*. The second end surface 172* is disposed at an angle such that the second end surface 172* becomes progressively closer to the inner bore 142* in a direction that extends away from the jacket assembly 20. The second end surface 172* engages a sidewall 180* of the slot 62 while the plunger 110* is in a retracted position. The sidewall 180* is disposed at an angle complementary to the angle of the second end surface 172*.

The biasing member 112* is disposed within the inner bore 142* of the sleeve 114*. The biasing member 112* engages the second portion 122* of the plunger 110* a portion of the sleeve 114* proximate the shoulder 164*. The engagement of the biasing member 112 with the portion of the sleeve 114* proximate the shoulder 164* applies a preload force to the biasing member 112* to bias the plunger 110* towards the deployed position.

Prior to a collapse event, the jacket assembly 20 is in a first position. There may not be relative motion between the first jacket assembly 30 and the second jacket assembly 32 while the jacket assembly 20 is in the first position. Additionally, while the jacket assembly 20 is in the first position, the first portion 120* of the plunger 110* is at least partially received within the slot 62. The first portion 120* of the plunger 110* is at least partially received within the slot 62 such that the second end surface 172* of the first portion 120* of the plunger 110* is engaged with the sidewall 180* of the slot 62.

During a collapse event, the jacket assembly 20 translates from the first position towards the second position. There is relative motion between the second jacket assembly 32 and the first jacket assembly 30 during the collapse event causing relative motion between the first jacket assembly 30 and the rake mounting bracket 22. The relative motion between the first jacket assembly 30 and the rake mounting bracket 22 may cause the plunger 110* to move from a retracted position to a deployed position. The first portion 120* of the plunger 110* is further received within the slot 62. The further receipt of the first portion 120* of the plunger 110* within the slot 62 inhibit relative motion between the first jacket assembly 30 and the rake mounting bracket 22 and inhibits further rotation, raking, or pitching of the jacket assembly 20 about the pivot axis 60.

Referring to FIGS. 5A and 5B, an exemplary steering column assembly 190 is shown. The steering column assembly includes a jacket assembly 200, a mounting bracket 202 and a plunger assembly 204. The jacket assembly 200 extends along the first axis 14. The jacket assembly 200 includes an exterior surface 210 defining an opening 212. The opening 212 extends at least partially through the jacket assembly 200 from the exterior surface 210 towards the first axis 14 along a second axis 214. The second axis 214 is disposed substantially perpendicular to the first axis 14.

The mounting bracket 202 is disposed on the jacket assembly 200. The mounting bracket 202 includes an interior surface 220 defining a slot 222. The interior surface 220 of the mounting bracket 202 is disposed proximate the exterior surface 210 of the jacket assembly 200. The slot 222 extends at least partially through the mounting bracket 202 from the interior surface 220 away from the first axis 14 along a third axis 224. The third axis 224 is disposed substantially perpendicular to the first axis 14. The third axis 224 is disposed substantially parallel to but not coaxial with the second axis 214.

The plunger assembly 204 is received within the opening 212. The plunger assembly 204 includes a plunger 230 and a biasing member 232. The plunger 230 is slidably disposed within the opening 212 of the jacket assembly 200. The plunger 230 includes a first portion 240 disposed opposite a second portion 242. The first portion 240 of the plunger 230 extends from the opening 212 of the jacket assembly 200 and is disposed proximate the interior surface 220 of the mounting bracket 202.

The biasing member 232 is disposed within the opening 212 of the jacket assembly 200. The biasing member 232 engages the second portion 242 of the plunger 230 and an interior surface of the jacket assembly 200. The engagement between the biasing member 232 and the interior surface of the jacket assembly 200 and the second portion 242 of the plunger 230 biases the plunger 230 towards a deployed position.

Prior to a collapse event, the jacket assembly 20 is in a first position. The jacket assembly 200 is stationary relative to the operator of the vehicle while the jacket assembly 200 is in the first position. While the jacket assembly 200 is in the first position the first portion 240 of the plunger 230 is disposed proximate the slot 222 and may not be received within the slot 62. In at least one embodiment, the slot 222 of the mounting bracket 202 may at least partially overlap the opening 212 of the jacket assembly 200 such that the first portion 240 of the plunger 230 engages the interior surface 220 of the mounting bracket 202 proximate the slot 222.

During a collapse event, the jacket assembly 200 translates from the first position towards a second position. The translation of the jacket assembly 200 from the first position towards the second position may cause the plunger 230 to move from a retracted position towards a deployed position. The first portion 240 of the plunger 230 is received within the slot 222 of the mounting bracket 202 to inhibit movement, rotation, raking, or pitching of the jacket assembly 200 about the pivot axis 60.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
a plunger assembly received within an opening defined by a mounting bracket, the plunger assembly comprises:
a sleeve disposed within the opening, the sleeve having an exterior surface, an inner bore, a first end portion includes a first rim extending inwardly towards a sleeve axis, and a second end portion spaced apart from the first end portion,
a plunger slidably disposed within the inner bore, the plunger having a first portion and a second portion disposed opposite the first portion, the first portion is disposed proximate a slot defined by a jacket assembly connected to the mounting bracket, and
a biasing member disposed within the inner bore that engages the second portion and the second end portion to bias the plunger towards a deployed position.

2. The steering column assembly of claim 1, wherein in response to the jacket assembly moving from a first position towards a second position, the plunger moves from a retracted position to the deployed position and the first portion is received within the slot.

3. The steering column assembly of claim 2, wherein the first end portion is disposed proximate the first portion and the second end portion is disposed proximate the second portion, the second end portion includes a second rim.

4. The steering column assembly of claim 3, wherein the plunger includes a lip extending about the second portion.

5. The steering column assembly of claim 4, wherein the lip engages the first rim to inhibit further movement of the plunger further within the slot.

6. The steering column assembly of claim 2, wherein the first portion of the plunger includes a first end surface and a second end surface disposed at an angle with respect to the first end surface such that the second end surface becomes progressively closer to the inner bore in a direction extending away from the jacket assembly towards the mounting bracket.

7. The steering column assembly of claim 6 wherein the second end surface engages a sidewall of the slot while the plunger is in a retracted position.

8. A steering column assembly comprising:
a jacket assembly extending along a first axis, the jacket assembly having an exterior surface and defining a slot that extends along a second axis and including a generally arcuate shape;
a mounting bracket having an interior surface disposed proximate the exterior surface, the mounting bracket defining an opening that extends along a third axis, the slot proximately aligned with the opening; and
a plunger assembly received within the opening, the plunger assembly comprises:
a sleeve disposed within the opening, the sleeve having an inner bore, a first end portion, and a second end portion,
a plunger slidably disposed within the inner bore, the plunger having a first portion disposed proximate the exterior surface and a second portion disposed opposite the first portion, and
a biasing member disposed within the inner bore that engages the second portion.

9. The steering column assembly of claim 8, wherein the third axis is disposed substantially perpendicular to the first axis and the second axis is disposed substantially perpendicular to the first axis.

10. The steering column assembly of claim 9, wherein the second axis is disposed substantially parallel but not coaxial with the third axis.

11. The steering column assembly of claim 8, wherein the slot at least partially overlaps the opening while the jacket assembly is in a first position such that the first portion of the plunger engages the interior surface of the mounting bracket.

12. The steering column assembly of claim 11, wherein the slot and the opening are proximately aligned such that the second axis is disposed substantially parallel and coaxial with the third axis while the jacket assembly moves from the first position towards a second position such that first portion of the plunger is received within the slot to inhibit further movement of the jacket assembly.

13. The steering column assembly of claim 8, wherein the biasing member engages the jacket assembly such that the biasing member biases the plunger towards a deployed position.

14. The steering column assembly of claim 8, wherein the plunger assembly further includes a sleeve disposed within the opening, wherein the plunger is at least partially received within the sleeve.

15. A steering column assembly, comprising:
a jacket assembly defining a slot and is pivotable about a pivot axis;
a mounting bracket defining an opening; and
a plunger assembly that is arranged to passively secure the jacket assembly relative to the mounting bracket, the plunger assembly is received within the opening and comprising:
a sleeve disposed within the opening, the sleeve having an exterior surface, an inner bore, a first end portion includes a first rim extending inwardly towards a sleeve axis, and a second end portion spaced apart from the first end portion,
a plunger slidably disposed within the inner bore, the plunger having a first portion and a second portion disposed opposite the first portion, the first portion is disposed proximate a slot defined by a jacket assembly connected to the mounting bracket, and
a biasing member disposed within the inner bore that engages the second portion, responsive to a collapse event, the slot and the opening become proximately aligned such that the first portion is received within the slot to inhibit relative motion between jacket assembly and the mounting bracket.

16. The steering column assembly of claim 15, wherein the slot extends along a second axis disposed substantially perpendicular to the first axis and the opening extends along a third axis disposed substantially perpendicular to the first axis.

17. The steering column assembly of claim 16, wherein the second axis is disposed substantially parallel but not coaxial with the third axis.

18. The steering column assembly of claim 17, wherein the slot at least partially overlaps the opening while the jacket assembly is in a first position such that the first portion of the plunger engages the exterior surface of the jacket assembly.

19. The steering column assembly of claim 18, wherein the slot and the opening are proximately aligned such that the second axis is disposed substantially parallel and substantially coaxial with the third axis while the jacket assembly moves from the first position towards a second position.

20. The steering column assembly of claim 15, wherein a preload fastener couples the plunger assembly to the mounting bracket and applies a preload to the biasing member.

\* \* \* \* \*